(12) United States Patent
Sumori

(10) Patent No.: US 12,325,818 B2
(45) Date of Patent: Jun. 10, 2025

(54) FLAME RETARDANT COMPOSITION

(71) Applicant: SUMORI HOLDINGS KABUSHIKI KAISHA, Sendai (JP)

(72) Inventor: Akira Sumori, Sendai (JP)

(73) Assignee: SUMORI HOLDINGS KABUSHIKI KAISHA, Sendai (JP)

( * ) Notice: Subject to any disclaimer, the term of this patent is extended or adjusted under 35 U.S.C. 154(b) by 361 days.

(21) Appl. No.: 18/007,927

(22) PCT Filed: Feb. 2, 2022

(86) PCT No.: PCT/JP2022/004133
§ 371 (c)(1),
(2) Date: Dec. 2, 2022

(87) PCT Pub. No.: WO2022/168890
PCT Pub. Date: Aug. 11, 2022

(65) Prior Publication Data
US 2023/0235230 A1    Jul. 27, 2023

(30) Foreign Application Priority Data
Feb. 2, 2021  (JP) .................................. 2021-015356

(51) Int. Cl.
*C09K 21/02* (2006.01)
*C09K 21/04* (2006.01)
*C09K 21/14* (2006.01)

(52) U.S. Cl.
CPC .............. *C09K 21/02* (2013.01); *C09K 21/04* (2013.01); *C09K 21/14* (2013.01)

(58) Field of Classification Search
None
See application file for complete search history.

(56) References Cited

U.S. PATENT DOCUMENTS

| | | | | |
|---|---|---|---|---|
| 3,094,517 A | * | 6/1963 | Stanley | C08B 37/0042 536/122 |
| 3,562,176 A | * | 2/1971 | Stancioff | A01N 25/10 106/311 |
| 2005/0118130 A1 | * | 6/2005 | Utz | A61K 8/9789 424/70.13 |
| 2010/0034757 A1 | * | 2/2010 | Fujii | A61Q 19/00 435/267 |
| 2020/0022325 A1 | * | 1/2020 | Ganuza Taberna | A01H 3/00 |
| 2020/0060283 A1 | * | 2/2020 | Shinde | A01N 65/03 |

FOREIGN PATENT DOCUMENTS

JP    2013-043891 A    3/2013

OTHER PUBLICATIONS

CN 105175138 A (Year: 2015).*
CN 106966793 A (Year: 2017).*
CN 108485149 A (Year: 2018).*
KR 1646215 B1 (Year: 2016).*
Mar. 8, 2022 International Search Report issued in Patent Application No. PCT/JP2022/004133.

* cited by examiner

*Primary Examiner* — Joseph D Anthony
(74) *Attorney, Agent, or Firm* — Oliff PLC

(57) ABSTRACT

Provided is a flame retardant composition which can be used without solidification for a long period of time, and has suppressed odor derived from the Tsunomata seaweed glue. The flame retardant composition contains boric acid or a borate, a Tsunomata seaweed glue, a zeolite powder and water. The flame retardant composition may further contain lime. The flame retardant composition may contain one or more combinations of an aluminum powder, a copper powder and a silver powder. It is preferred that the boric acid or borate is contained in an amount of 5 to 35% by mass relative to the whole, the Tsunomata seaweed glue is contained in an amount of 1 to 10% by mass relative to the whole, the zeolite powder is contained in an amount of 0.3 to 35% by mass relative to the whole, the hydrated lime is contained in an amount of 0.5 to 10% by mass relative to the whole, one or more combinations of the aluminum powder, the copper powder and the silver powder are contained in an amount of 0.3 to 3% by mass relative to the whole, and water is contained in an amount of 50 to 85% by mass relative to the whole.

4 Claims, No Drawings

FLAME RETARDANT COMPOSITION

FIELD OF THE INVENTION

The present invention relates to flame retardant compositions.

DESCRIPTION OF RELATED ART

There have conventionally been disclosed non-combustible coating materials which are obtained by mixing inorganic aggregates or non-combustible agents such as aluminum hydroxide, boric acid or a borate with hydraulic inorganic powders such as white cement to form a powder formulation, and kneading a liquid formulation composed of aqueous emulsion resins such as an acrylic resin with the powder formulation (see, for example, Patent Literature 1).

Also, lime plasters (Shikkui) are known as conventional flame-retardant plastering materials. Hydrated lime and Tsunomata seaweed glues are used as materials for lime plasters.

CITATION LIST

Patent Literature 1: JP-A-2013-43891

SUMMARY OF THE INVENTION

However, since the non-combustible coating material described in Patent Literature 1 contains aqueous emulsion resins such as an acrylic resin, there was a problem that the non-combustible coating material is solidified after the lapse of one month, thus failing to be spray-coated.

There was also a problem that the lime plaster has odor, peculiar to seaweeds, derived from a Tsunomata seaweed glue as a raw material.

The present invention has been made focusing on those problems, and it is an object of the present invention to provide a flame retardant composition which can be used without solidification for a long period of time, and has suppressed odor derived from the Tsunomata seaweed glue.

To attain the above object, the flame retardant composition according to the present invention contains boric acid or a borate, a Tsunomata seaweed glue, a zeolite powder and water.

The flame retardant composition according to the present invention may further contain lime. The lime is preferably hydrated lime.

The flame retardant composition according to the present invention may further contain aluminum hydroxide.

The flame retardant composition according to the present invention may further contain one or more combinations of an aluminum powder, a copper powder and a silver powder.

It is preferred that the boric acid or borate is contained in an amount of 5 to 35% by mass relative to the whole, the Tsunomata seaweed glue is contained in an amount of 1 to 10% by mass relative to the whole, the zeolite powder is contained in an amount of 0.3 to 35% by mass, the hydrated lime is contained in an amount of 0.5 to 10% by mass relative to the whole, one or more combinations of the aluminum powder, the copper powder and the silver powder are contained in an amount of 0.3 to 3% by mass relative to the whole, and water is contained in an amount of 50 to 85% by mass relative to the whole.

It is preferred that the boric acid or borate is contained in an amount of 5 to 35% by mass relative to the whole, the Tsunomata seaweed glue is contained in an amount of 1 to 10% by mass relative to the whole, the zeolite powder is contained in an amount of 0.3 to 35% by mass, the hydrated lime is contained in an amount of 0.5 to 10% by mass relative to the whole, one or more combinations of the aluminum powder, the copper powder and the silver powder are contained in an amount of 0.3 to 3% by mass relative to the whole, the aluminum hydroxide is contained in an amount of 3 to 10% by mass relative to the whole, and water is contained in an amount of 50 to 85% by mass relative to the whole.

The flame retardant composition according to the present invention has high flame retardancy due to boric acid or a borate and a zeolite powder. The boric acid or borate further has an antifungal function and an anti-termite function. The flame retardant composition according to the present invention does not contain an aqueous emulsion resin such as an acrylic resin, and can be used without solidification for a long period of time due to a Tsunomata seaweed glue. The Tsunomata seaweed glue also has an antifungal function. Since a zeolite powder is contained, the odor derived from the Tsunomata seaweed glue is suppressed.

When lime is further contained, the flame retardancy can be further enhanced.

When aluminum hydroxide is contained, the flame retardancy can be further enhanced.

When one or more combinations of an aluminum powder, a copper powder and a silver powder are contained, the flame retardant composition has high antibacterial properties.

According to the present invention, it is possible to provide a flame retardant composition which can be used without solidification for a long period of time, and has suppressed odor derived from the Tsunomata seaweed glue.

DETAILED DESCRIPTION OF THE INVENTION

Hereinafter, embodiments of the present invention will be described.

The flame retardant composition according to embodiments of the present invention contains boric acid or a borate, a Tsunomata seaweed glue, a zeolite powder and water. The borate is preferably sodium borate. The Tsunomata seaweed glue is composed of glue extracted by boiling Tsunomata seaweed. It is possible to use, as the Tsunomata seaweed glue, commercially available ones. The Tsunomata seaweed is seaweed which belongs to the Plantae, Rhodophyta, Rhodophyceae, Florideophycidae, Gigartinales, Gigartinaceae, Chondrus. It is also possible to use, as the Tsunomata seaweed glue, those obtained by dissolving commercially available powdered Tsunomata seaweed glue in water. In that case, it is preferred to use an aqueous 1% by mass solution of the powdered Tsunomata seaweed glue. The zeolite powder preferably has a particle size of 50 μm or less. Water containing a zeolite powder having a particle size of 50 μm or less dispersed therein can be injected by an electric spray gun, and it is possible to adjust the thickness of an adhesion layer by increasing the number of sprays.

It is preferred that the boric acid or borate is contained in an amount of 5 to 35% by mass relative to the whole, the Tsunomata seaweed glue is contained in an amount of 1 to 10% by mass relative to the whole, the zeolite powder is contained in an amount of 0.3 to 35% by mass relative to the whole, and water is contained in an amount of 50 to 85% by mass relative to the whole.

The flame retardant composition may contain lime. The lime is preferably hydrated lime. When the hydrated lime is contained, it is preferably contained in an amount of 0.5 to 10% by mass relative to the whole.

The flame retardant composition may also contain aluminum hydroxide. When the aluminum hydroxide is contained, it is preferably contained in an amount of 3 to 10% by mass relative to the whole.

The flame retardant composition may also contain one or more combinations of an aluminum powder, a copper powder and a silver powder. When the aluminum powder, the copper powder and/or the silver powder are contained, they are preferably contained in an amount of 0.3 to 3% by mass relative to the whole.

The flame retardant composition according to embodiments has high flame retardancy due to boric acid or a borate and a zeolite powder. The boric acid or borate has an antifungal function and an anti-termite function, in addition to a flame retardant action. The Tsunomata seaweed glue has an action to firmly adhere boric acid or a borate and a zeolite powder to a target to be imparted with the flame retardancy. Since the Tsunomata seaweed glue uniformly disperses boric acid or a borate and a zeolite powder in water, the flame retardant composition can be used without solidification for a long period of time by shaking during use. The Tsunomata seaweed glue also has an antifungal action. The flame retardant composition according to the present embodiment does not contain an aqueous emulsion resin such as an acrylic resin and is made of a naturally-derived material, and also has high safety to the human body and long-term durability.

The zeolite powder has moisture absorption/desorption properties and captures boric acid or a borate to improve the fixability and stability of the boric acid or borate, because of having porosity. The fixed boric acid or borate exhibits an antifungal function and an anti-termite function over a long period of time. The boric acid or borate fixed to the zeolite powder also exerts a bactericidal effect and an antiviral effect even though the effects are weak. The zeolite powder also has an effect of absorbing ammonia ions or the like. Since the zeolite powder is contained, the odor derived from the Tsunomata seaweed glue is suppressed.

The flame retardant composition can be coated by spraying with a power spray gun after shaking. Therefore, it can be coated with good workability. When the flame retardant composition is adhered and penetrated into the surface of a target to be imparted with flame retardancy, a high flame retardant effect can be exerted on the target to be imparted with the flame retardancy. The flame retardant composition may be penetrated into the surface of the target to be imparted with flame retardancy by dipping, coating, spraying, or any other method. Alternatively, the flame retardant composition may be used after mixing with a coating material or the like.

Although the Tsunomata seaweed glue has peculiar odor, the zeolite powder can effectively suppress the odor of the Tsunomata seaweed glue.

When lime is further contained, the flame retardancy can be further enhanced.

When aluminum hydroxide is contained, the flame retardancy can be further enhanced.

When one or more combinations of an aluminum powder, a copper powder and a silver powder are contained, the flame retardant composition has high antibacterial properties. The aluminum powder, the copper powder and the silver powder easily disperse the zeolite powder and the boric acid or borate throughout the composition, thus making it possible to enhance the flame retardant effect.

Examples of the target to be imparted with flame retardancy include woods, papers, foamed resins, rubbers or the like. Woods may be used for any purposes such as flooring, ceiling boards, structures and boards. The flame retardant composition may contain additives such as colorants, antifungal agents and insecticides.

Example 1

To 61 parts by mass of hot water at 45° C., 3 parts by mass of a Tsunomata seaweed glue, 18 parts by mass of boric acid and 18 parts by mass of a zeolite powder were added, followed by mixing with an electric mixer to produce a flame retardant composition of Example 1. Commercially available Tsunomata seaweed glue (manufactured by Murakashi Lime Industry Co., Ltd.) was used as the Tsunomata seaweed glue. A zeolite powder having a particle size of 50 μm or less was used as the zeolite powder.

Example 2

To 60 parts by mass of hot water at 45° C., 3 parts by mass of a Tsunomata seaweed glue, 18 parts by mass of boric acid, 1 part by mass of a copper powder and 18 parts by mass of a zeolite powder were added, followed by mixing with an electric mixer to produce a flame retardant composition of Example 2. The same materials as those in Example 1 were used as materials other than the copper powder.

Example 3

To 57 parts by mass of hot water at 45° C., 3 parts by mass of a Tsunomata seaweed glue, 18 parts by mass of boric acid, 1 part by mass of a copper powder, 18 parts by mass of a zeolite powder and 3 parts by mass of hydrated lime were added, followed by mixing with an electric mixer to produce a flame retardant composition of Example 3. The same materials as those in Example 1 were used as materials other than the copper powder and hydrated lime.

Example 4

To 65 parts by mass of hot water at 45° C., 3 parts by mass of a Tsunomata seaweed glue, 26 parts by mass of boric acid, 1 part by mass of a copper powder, 1 part by mass of a zeolite powder, 1 part by mass of hydrated lime and 3 parts by mass of aluminum hydroxide were added, followed by mixing with an electric mixer to produce a flame retardant composition of Example 4. The same materials as those in Example 1 were used as materials other than the copper powder, hydrated lime and aluminum hydroxide.

Comparative Example 1

According to the following formulation, a flame retardant composition of Comparative Example 1 was produced. The same materials as those in Example 3 were used for each material.

To 57 parts by mass of hot water at 45° C., 3 parts by mass of a Tsunomata seaweed glue, 18 parts by mass of boric acid, 1 part by mass of a copper powder and 3 parts by mass of hydrated lime, followed by mixing with an electric mixer to produce a flame retardant composition of Comparative Example 1.

Comparative Example 2

According to the following formulation, a flame retardant composition of Comparative Example 2 was produced. The same materials as those in Example 1 were used for each material except for an emulsion-type adhesive.

To 60 parts by mass of hot water at 45° C., 3 parts by mass of an acrylic copolymer resin-based emulsion-type adhesive (trade name "Bond Super Joint X, White" manufactured by Konishi Co., Ltd.), 18 parts by mass of boric acid, 1 part by mass of a copper powder and 18 parts by mass of a zeolite powder, followed by mixing with an electric mixer to produce a flame retardant composition of Comparative Example 2.

The flame retardant compositions of Examples 1 to 4 and Comparative Examples 1 and 2 were charged in a sealed container, and a copy paper of 10 cm×10 cm was immersed in the flame retardant composition after stirring. The immersed copy paper was taken out from the sealed container, naturally dried and then heated with a burner at about 1,200° C. for 1 minute. As a result, flames did not rise, although all copy paper was carbonized black.

The flame retardant compositions of Examples 1 to 4 and Comparative Example 2 did not have any odor, whereas the flame retardant composition of Comparative Example 1 had odor peculiar to the Tsunomata seaweed.

Each of the flame retardant compositions of Examples 1 to 4 and Comparative Examples 1 and 2 was charged in an electric spray gun, stirred and then left to stand for 30 days, 60 days and 180 days. After shaking, a nozzle was immersed in hot water and then a spraying treatment was performed. As a result, in the case of the flame retardant compositions of Examples 1 to 4 and Comparative Example 1, a spray treatment could be performed in the same manner as immediately after the production even after 180 days. In contrast, in the case of the flame retardant composition of Comparative Example 2, a spray treatment could not be performed on the 30th day even though shaking was performed and the nozzle was immersed in hot water because the flame retardant composition was solidified inside the electric spray gun.

Each of the electric spray guns containing the flame retardant compositions of Examples 1 to 4 and Comparative Example 1 could be used repeatedly by replenishing each flame retardant composition over and over again without washing the inside of the electric spray gun. In contrast, the electric spray gun containing the flame retardant composition of Comparative Example 2 could not be used repeatedly unless the inside of the electric spray gun is washed because the flame retardant composition adhered to the inside is gradually solidified.

What is claimed is:

1. A flame retardant composition containing
   boric acid or a borate,
   a Tsunomata seaweed glue,
   a zeolite powder,
   one or more combinations of an aluminum powder, a copper powder and a silver powder, and
   water.

2. The flame retardant composition according to claim 1, which further contains hydrated lime.

3. The flame retardant composition according to claim 2, which further contains aluminum hydroxide.

4. The flame retardant composition according to claim 3, wherein
   the boric acid or borate is contained in an amount of 5 to 35% by mass relative to the whole,
   the Tsunomata seaweed glue is contained in an amount of 1 to 10% by mass relative to the whole,
   the zeolite powder is contained in an amount of 0.3 to 35% by mass relative to the whole,
   the hydrated lime is contained in an amount of 0.5 to 10% by mass relative to the whole,
   one or more combinations of the aluminum powder, the copper powder and the silver powder are contained in an amount of 0.3 to 3% by mass relative to the whole,
   the aluminum hydroxide is contained in an amount of 3 to 10% by mass relative to the whole, and
   the water is contained in an amount of 50 to 85% by mass relative to the whole.

* * * * *